(No Model.)
J. COCKBURN.
FLEXIBLE HOSE OR TUBING.
No. 475,384. Patented May 24, 1892.
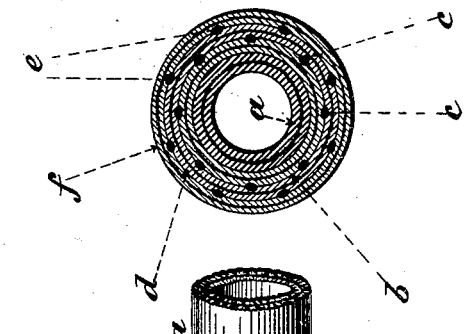
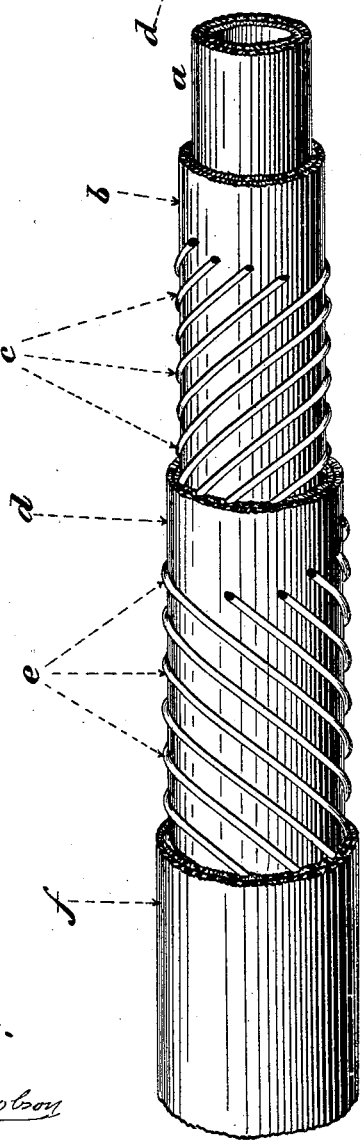
Witnesses:
E. Gatterer
Abram Jacobson
Inventor:
John Cockburn
Per Edw. E. Quimby
Atty.

UNITED STATES PATENT OFFICE.

JOHN COCKBURN, OF EDINBURGH, SCOTLAND, ASSIGNOR TO THE NORTH BRITISH RUBBER COMPANY, LIMITED, OF SAME PLACE.

FLEXIBLE HOSE OR TUBING.

SPECIFICATION forming part of Letters Patent No. 475,384, dated May 24, 1892.

Application filed January 12, 1892. Serial No. 417,786. (No model.) Patented in England July 14, 1890, No. 10,958.

*To all whom it may concern:*

Be it known that I, JOHN COCKBURN, of Edinburgh, Scotland, have invented certain Improvements in Flexible Hose or Tubing, of which the following is a specification.

These improvements are described in British Patent No. 10,958 of 1890, sealed May 16, 1891. They relate to flexible hose or tubing intended to withstand high internal pressure; and the invention consists in the application to ordinary hose made of india-rubber, leather, or other material, either with or without wire, of a reinforcing-covering composed, essentially, of a hollow cylinder of rubber-coated cloth or canvas having embedded into its interior surface a multiplicity of wires wound in one direction into sharply-pitched spirals with their convolutions interplaced and having embedded into its exterior surface a multiplicity of wires wound in the opposite direction into sharply-pitched spirals with their convolutions interplaced. This reinforcing-covering may be completed by the vulcanization of its rubber component and be then drawn over a tube of leather or other material which would be injured by exposure to the heat employed in vulcanization, or the reinforcing-covering may be made integral with an india-rubber hose, in which latter case, before the india-rubber hose is vulcanized, the inner series of wires are wound spirally around it at a pitch or angle of forty-five degrees (more or less) to the axis of the tube and with their convolutions interplaced. Around these spirally-laid wires is then wrapped a layer of cloth or canvas rubber-coated on both sides, which is pressed down between the convolutions of the spirals, and is thereby made to adhere to the rubber periphery of the hose. Outside this cloth covering a second series of wires is tightly wound spirally in the direction opposite to that of the inner series of wires, and, if desired, another wrapper of rubber-coated cloth or canvas is laid around the outside of the second series of spirally-wound wires, and closely pressed into the spaces between the convolutions of the outer spirals. The structure thus built up is then vulcanized in the usual manner. The cloth wrappers are purposely coated with sufficiently-thick layers of rubber to permit of the embedding of the wires therein, so that after vulcanization of the structure the convolutions of the spirals are firmly held at prescribed distances apart. The reinforcement of the hose, as herein described, by two systems of strengthening wires, the members of which are respectively wound in opposite directions in spirals of rapid pitch, not only increases the capacity of the hose to resist radially-outward internal pressure, but also its capacity to withstand longitudinal strains.

The accompanying drawings, illustrating the invention, are as follows:

Figure 1 is a view of a reinforced hose, with portions of the successive layers of its reinforcing-covering represented as removed. Fig. 2 is a transverse section of the reinforced hose.

The drawings represent a hose or tube $a$, on the exterior of which is a wrapper $b$ of rubber-coated cloth or canvas. Laid around the exterior of the wrapper $b$ is a system $c$, composed of a multiplicity of wires formed into spirals of rapid pitch with their convolutions interplaced. Outside the system of wires $c$ is a wrapper $d$ of rubber-coated cloth or canvas, upon the exterior of which is laid a second system of wires $e$, the members of which are wound into spirals of rapid pitch in a direction opposite that of the system of wires $c$, and with their convolutions also interplaced. Outside the system of wires $e$ is the exterior wrapper $f$ of rubber-coated cloth or canvas. The two systems of spirally-wound wires $c$ and $e$ and the rubber-coated wrapper $b$, interposed between the said two systems, are the essential components of the reinforcing-covering, which constitutes the principal feature of the present improvement. They need not necessarily be provided with the outer wrapper $f$, although such provision will usually be preferred. In applying this reinforcing-covering to india-rubber hose, the inner system $c$ of strengthening-wires is laid around the exterior of the rubber hose before vulcanization, and after the covering has been completed by the addition of the wrappers and system $e$ of strengthening-wires, the rubber hose and the rubber components of the reinforcing-covering are all vulcanized at one operation.

In applying the improvement to woven hose the surface of the woven hose is first coated with a coating of india-rubber, into which the inner system c of strengthening-wires is embedded, a mandrel being inserted inside the woven hose to hold it in position while being wrapped and covered with wire.

When the improvement is to be applied to a hose made of leather or other material which would be injured by being exposed to the heat required for vulcanization, the reinforced covering is prepared by wrapping one or more layers of rubber-coated cloth or canvas around a mandrel of the same exterior diameter as the hose which is to be reinforced, and for the purposes of illustration the tube a (represented in Fig. 1) may be assumed to be such a mandrel covered by the wrapper b of rubber-coated canvas. After the several layers of which the covering is composed have been successively applied, the structure is vulcanized in the ordinary manner, after which the leather hose is drawn inside of it. The leather hose thus inclosed in the reinforcing-covering will resist a considerable internal pressure, but will not have the strength of an india-rubber hose covered as described.

When the hose is to be used to carry steam, it is especially desirable to make the reinforcing-covering an integral part of the hose itself, and for convenience of illustration the wrapper b may be assumed to be the stratum of india-rubber upon the exterior of an india-rubber hose before vulcanization. In this case the systems of strengthening-wires and the interposed wrappers are successively applied, after which the structure is vulcanized.

It will of course be understood that more than two systems of strengthening-wires with interposed layers of rubber-coated canvas may be employed, if desired, without departure from the invention, and it is further to be remarked that the term "rubber-coated" is herein employed in its broad sense as comprehending the rubber compositions commonly used for coating the surface of woven fabrics entering into the structure of rubber hose.

What is claimed as the invention is—

1. The combination, with a hose or pipe, of a reinforcing-covering consisting, essentially, of two oppositely-wound systems of strengthening-wires, each of which systems is composed of a multiplicity of wires wound in spirals of rapid pitch with their convolutions respectively interplaced and separated from each other by cloth or canvas rubber-coated on both sides and interposed between the said two systems of strengthening-wires.

2. A vulcanized india-rubber hose or pipe formed integrally with a reinforcing-covering containing two systems of wires, the members of which wind in rapid spirals in respectively opposite directions and are embedded in layers of rubber-coated cloth or canvas, substantially as set forth.

3. A woven hose or pipe coated exteriorly with india-rubber and with a reinforcing-covering containing two systems of wires, the members of which wind in rapid spirals in respectively opposite directions and are embedded in interposed layers of rubber-coated cloth or canvas; the rubber components of the structure being vulcanized together, substantially as described.

4. The reinforcing-covering herein described, capable of being used separately as a hose or as a covering for a hose or pipe drawn within it, the same consisting, essentially, of two systems of wires, the members of which wind in rapid spirals in relatively opposite directions with their convolutions respectively interplaced and embedded in rubber coatings respectively covering the interior and exterior of a woven fabric interposed between the said systems of wires.

JOHN COCKBURN.

Witnesses:
  WILLIAM FIRTH,
    *Castle Mills, Edinburgh.*
  ALEX. LAWSON,
    11 *Cluny Avenue, Edinburgh.*